US 6,634,694 B2

(12) United States Patent
Matsushita

(10) Patent No.: US 6,634,694 B2
(45) Date of Patent: Oct. 21, 2003

(54) VEHICULAR FOOTREST CONSTRUCTION

(75) Inventor: Yasuhiro Matsushita, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 10/037,131

(22) Filed: Jan. 2, 2002

(65) Prior Publication Data

US 2002/0096904 A1 Jul. 25, 2002

(30) Foreign Application Priority Data

Jan. 19, 2001 (JP) ........................................ 2001-011019

(51) Int. Cl.7 .................................................. B60N 3/06
(52) U.S. Cl. ...................................................... 296/75
(58) Field of Search ........................................... 296/75

(56) References Cited

U.S. PATENT DOCUMENTS 6,220,643 B1 * 4/2001 Kato ............................ 296/75
6,318,786 B1 * 11/2001 Sauve et al. .................. 296/75
6,478,359 B2 * 11/2002 Dendo et al. ................. 296/75

FOREIGN PATENT DOCUMENTS

DE 33 37 781 C1 * 10/1983 ................... 296/75

* cited by examiner

Primary Examiner—Joseph D. Pape
(74) Attorney, Agent, or Firm—Lerner, David, Littenberg, Krumholz & Mentlik, LLP

(57) ABSTRACT

In a vehicular footrest construction in which a footrest depression face plate on which the passenger's foot is placed is disposed on a pedal bracket fixed to a vehicle body, the pedal bracket 8 is formed by bending one steel sheet so that a footrest depression face plate attaching portion 8a of the pedal bracket 8 to which the footrest depression face plate 9 is installed is supported by three wall faces 8b, 8c and 8d. Thereby, there is provided a vehicular footrest construction capable of ensuring sufficient stiffness with a simple construction and increasing the assembling work efficiency.

9 Claims, 8 Drawing Sheets

VEHICULAR FOOTREST CONSTRUCTION

FIELD OF THE INVENTION AND RELATED ART STATEMENT

The present invention relates to a construction of a footrest on which the passenger's foot is placed.

As shown in FIGS. 6 and 7, a conventional footrest pedal bracket 100 is formed into a hat shape in cross section, and is provided with a pair of flange portions 100b at the lower ends of side wall faces 100a on both sides. The footrest pedal bracket 100 is installed by joining the flange portions 100b to a dash panel 102 of a vehicle body 101 by spot welds w. To the dash panel 102, a dash silencer 103 is assembled. In assembling, the dash silencer 103 is assembled so that the footrest pedal bracket 100 projects to the outside from an opening 103a of the dash silencer 103.

Thus, the footrest pedal bracket 100 is disposed so that the flange portions 100b intrude on the lower side of the dash silencer 103.

Next, the dash silencer 103 is covered with a carpet 104, and the outside of the footrest pedal bracket 100 is also covered with the carpet 104.

Then, a footrest depression face plate 105 is assembled to the footrest pedal bracket 100 with the carpet 104 being interposed therebetween. Specifically, the footrest depression face plate 105 is threadedly mounted to the footrest pedal bracket 100 together with the carpet 104 with screws 106.

As another type of footrest construction, as shown in FIG. 8, two stud bolts 107 are erectly provided on a dash panel 102 so as to be directed toward the cabin side, and a dash silencer and a carpet, both not shown, are assembled to the stud bolts 107 by aligning the holes of the dash silencer and carpet with each other. Then, a resin-made footrest pedal 108 is installed by inserting the stud bolts 107 into bosses 108a formed on the back face of the footrest pedal 108.

However, with the method in which the footrest pedal bracket 100 is installed by means of spot welds w, since the footrest pedal bracket 100 is constructed so as to be supported by the side wall faces 100a on both sides, it is necessary to use a steel sheet having a great thickness to prevent deformation. Also, as shown in FIG. 7, a hole of the same size as that of the footrest pedal bracket 100 is formed in the dash silencer 103, so that the sound absorption property and sound insulation property may decrease.

Furthermore, there is often shown a tendency for the lower part of the dash panel 102 to be made as a separate part in order to make the thickness of the lower part greater than that of the upper part from the viewpoint of vehicle body strength.

If the dash panel 102 is constructed by a dash upper panel 102a and a dash lower panel 102b, the footrest pedal bracket 100 is sometimes disposed so as to stride the joint between the dash upper panel 102a and the dash lower panel 102b because of the passenger's posture, so that the installation of footrest may be difficult to accomplish.

In this case, the location in which the dash upper panel 102a and the dash lower panel 102b are joined to each other by spot welds w coincide with the location in which the footrest pedal bracket 100 is installed to the dash panel 102. Therefore, it is necessary that after the dash upper panel 102a and the dash lower panel 102b have been joined to each other by spot welds w, the footrest pedal bracket 100 be spot welded to the dash panel 102, which leads to an increase in work process, thereby increasing the cost.

Still further, a waterproof sealer is applied to a joint edge 109 of the dash upper panel 102a and the dash lower panel 102b, and this application work is difficult to do in the portion in which the footrest pedal bracket 100 is installed, and thus the efficiency of this work is poor.

On the other hand, with the method in which the resin-made footrest pedal 108 is assembled to the stud bolts 107, since the resin-made footrest pedal 108 is assembled afterward, the work for applying the waterproof sealer 110 is easy. However, since the resin-made footrest pedal 108 is assembled to the stud bolts 107 via the bosses 108a, the positions of the stud bolts 107 must coincide with the positions of assembly holes in the bosses 108a. Also, in the case where the resin-made footrest pedal 108 is installed so as to extend on both of the dash upper panel 102a and the dash lower panel 102b, the pitch L of the stud bolts 107 must be controlled strictly, which results in an increase in the cost of the dash panel 102 and the equipment cost.

OBJECT AND SUMMARY OF THE INVENTION

The present invention has been made to solve the above problems, and accordingly an object thereof is to provide a vehicular footrest construction capable of ensuring sufficient stiffness with a simple construction and increasing the assembling work efficiency.

To achieve the above object, the present invention provides a vehicular footrest construction in which a footrest depression face plate on which the passenger's foot is placed is disposed on a pedal bracket fixed to a vehicle body, wherein the pedal bracket is formed by bending one steel sheet so that a footrest depression face plate attaching portion of the pedal bracket to which the footrest depression face plate is installed is supported by three wall faces.

Also, in the present invention, the pedal bracket is formed so that a U-like shape is formed by an attachment face which is installed to the vehicle body, a side wall face continuous with one side of the attachment face, and the footrest depression face plate attaching portion continuous with the side wall face, and upper and lower wall faces are formed by bending, toward the attachment face, projecting portions provided at the upper and lower ends of the footrest depression face plate attaching portion, by which the footrest depression face plate attaching portion is supported by three wall faces.

Further, in the present invention, flange portions provided at the tip ends of the upper and lower wall faces are joined to the attachment face, and mounting holes for mounting the pedal bracket on the vehicle body side are formed in lapped portions of the flange portion and attachment face.

Still further, in the present invention, the pedal bracket is fixed, through the mounting holes, on bolts mounted on a dash panel, and the pedal bracket is installed after a painting process.

Also, in the present invention, at least one of the mounting holes is formed into an elongated hole extending in the vertical direction.

Further, in the present invention, a bolt for fixing a carpet is provided on the upper side of the attachment face.

Thus, according to the present invention, since the pedal bracket is formed by bending one steel sheet so that the footrest depression face plate attaching portion of the pedal bracket is supported by the three wall faces, the stiffness can be increased, and thus the cost can be reduced. Since a protrusion of a dash silencer is inserted into and arranged in an interior in cross section of the pedal bracket, the appearance can be improved. Also, since the pedal bracket except the attachment face which is attached to the vehicle body is covered with the dash silencer, the decrease in the sound absorption property and sound insulation property can be kept to the minimum. Since the pedal bracket is formed by bending one steel sheet so that the footrest depression face plate attaching portion of the pedal bracket is supported by the three wall faces, the stiffness of pedal bracket can be increased, and the strength and stiffness of a portion in which the footrest is installed to the vehicle body can be increased. Further, since the pedal bracket is installed after a painting process, the welding work efficiency for the welding of a lapped portion of a dash upper panel and a dash lower panel constituting the dash panel can be improved. Also, the work for applying a sealer to the lapped portion of the dash upper panel and the dash lower panel can be performed easily. Since at least one of the mounting holes is formed into an elongated hole extending in the vertical direction, the allowable range of dimensional accuracy of the pitch of mounting bolts becomes wide, so that the cost can be reduced. Further, since the bolt for fixing the carpet is provided on the upper side of the attachment face, the upper part of carpet can be fixed, and turning-up of the end portion and other troubles can be prevented. Therefore, the appearance can be improved.

DETAILED DESCRIPTION OF PREFERRED EMBODIMENTS

An embodiment of the present invention will now be described in detail with reference to the accompanying drawings.

Figure 1:
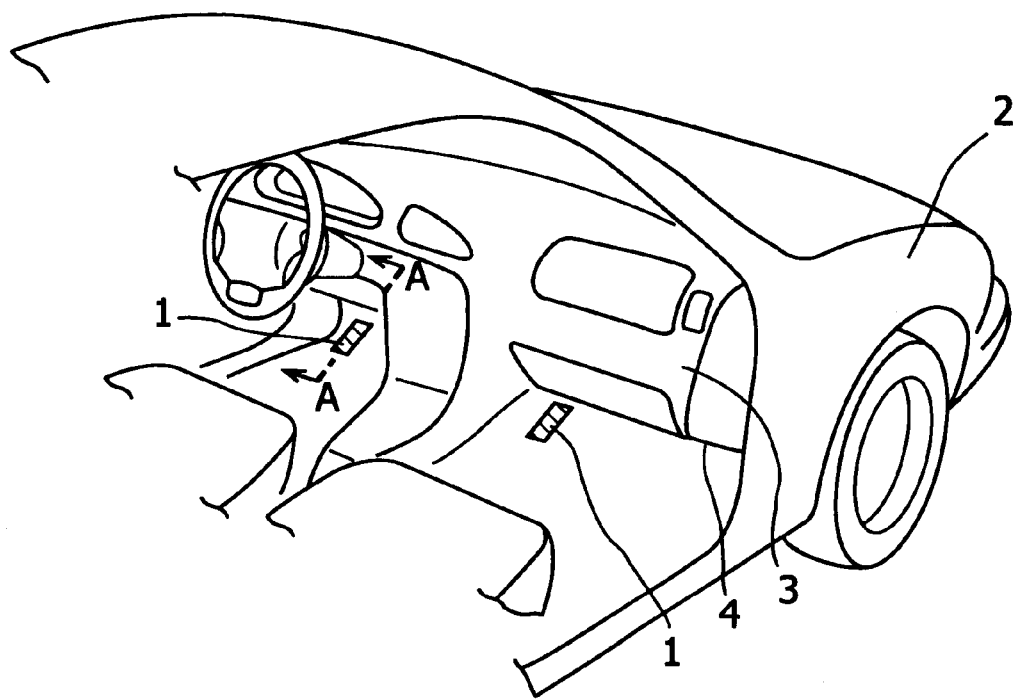
FIG. 1 is a schematic view of a vehicle body, showing an embodiment of a vehicular footrest construction in accordance with the present invention.
Figure 2:
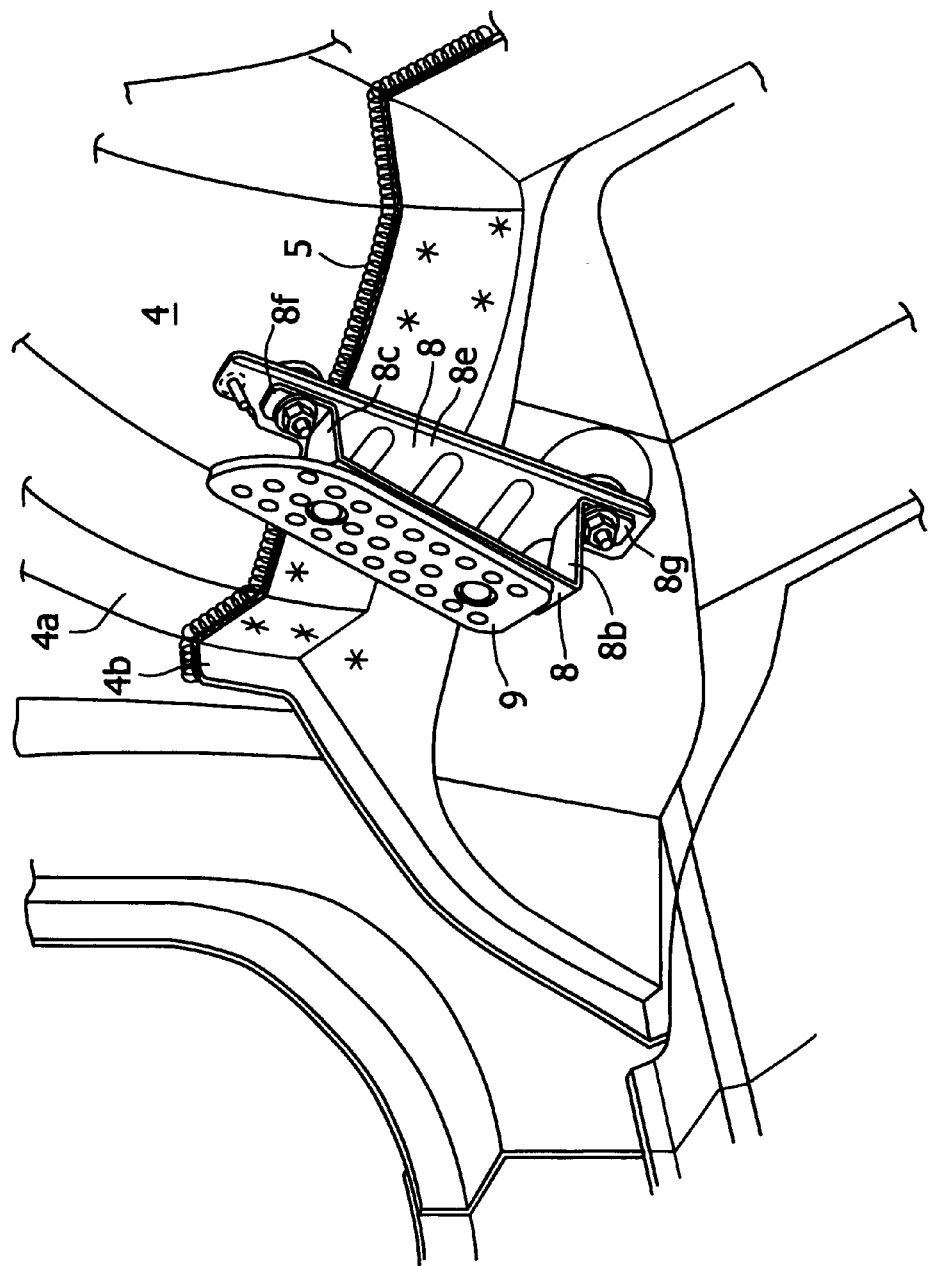
FIG. 2 is a perspective view showing an embodiment of a vehicular footrest construction in accordance with the present invention.
Figure 4:
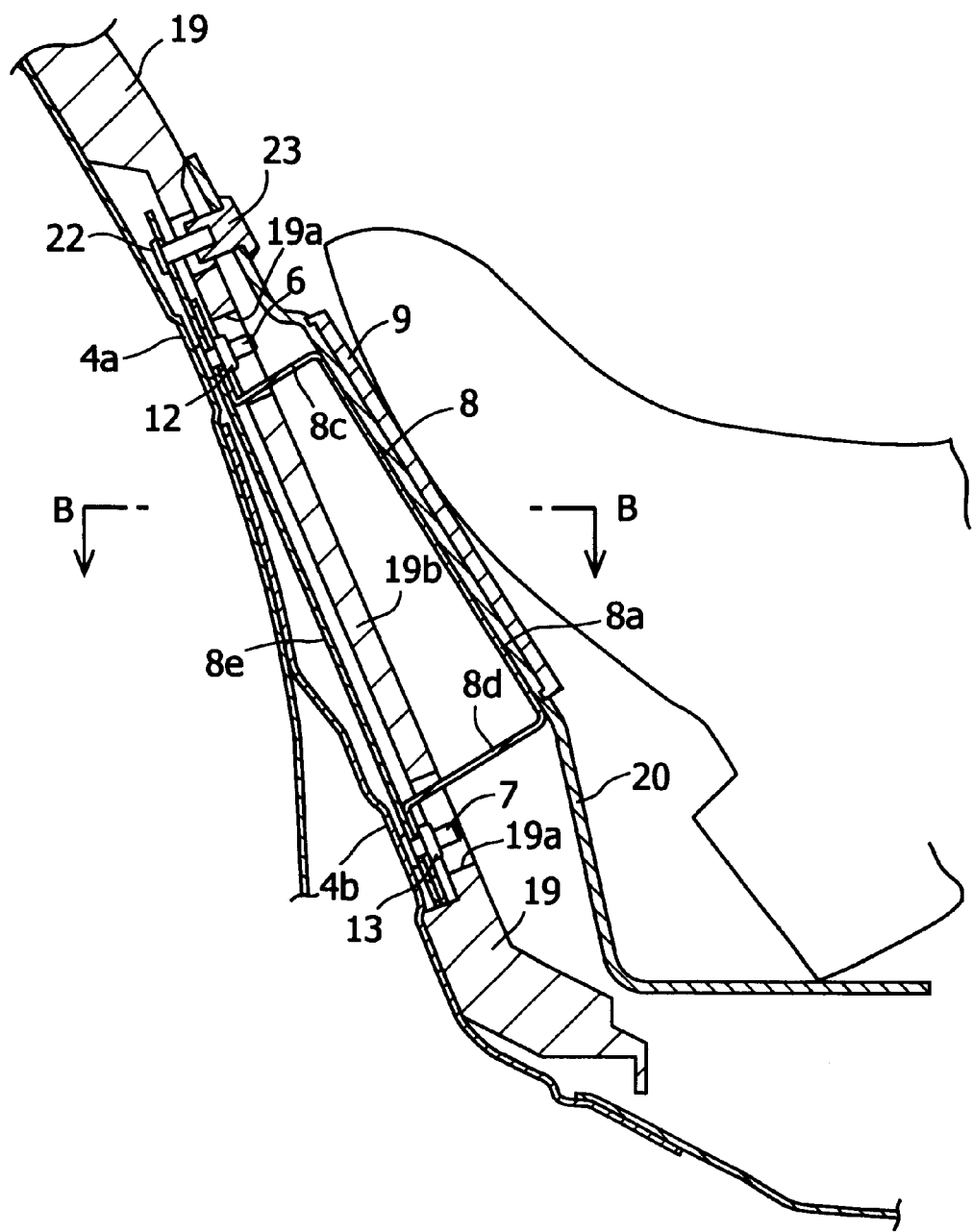
FIG. 4 is a sectional view taken along the line A—A of FIG. 1.
Figure 5:
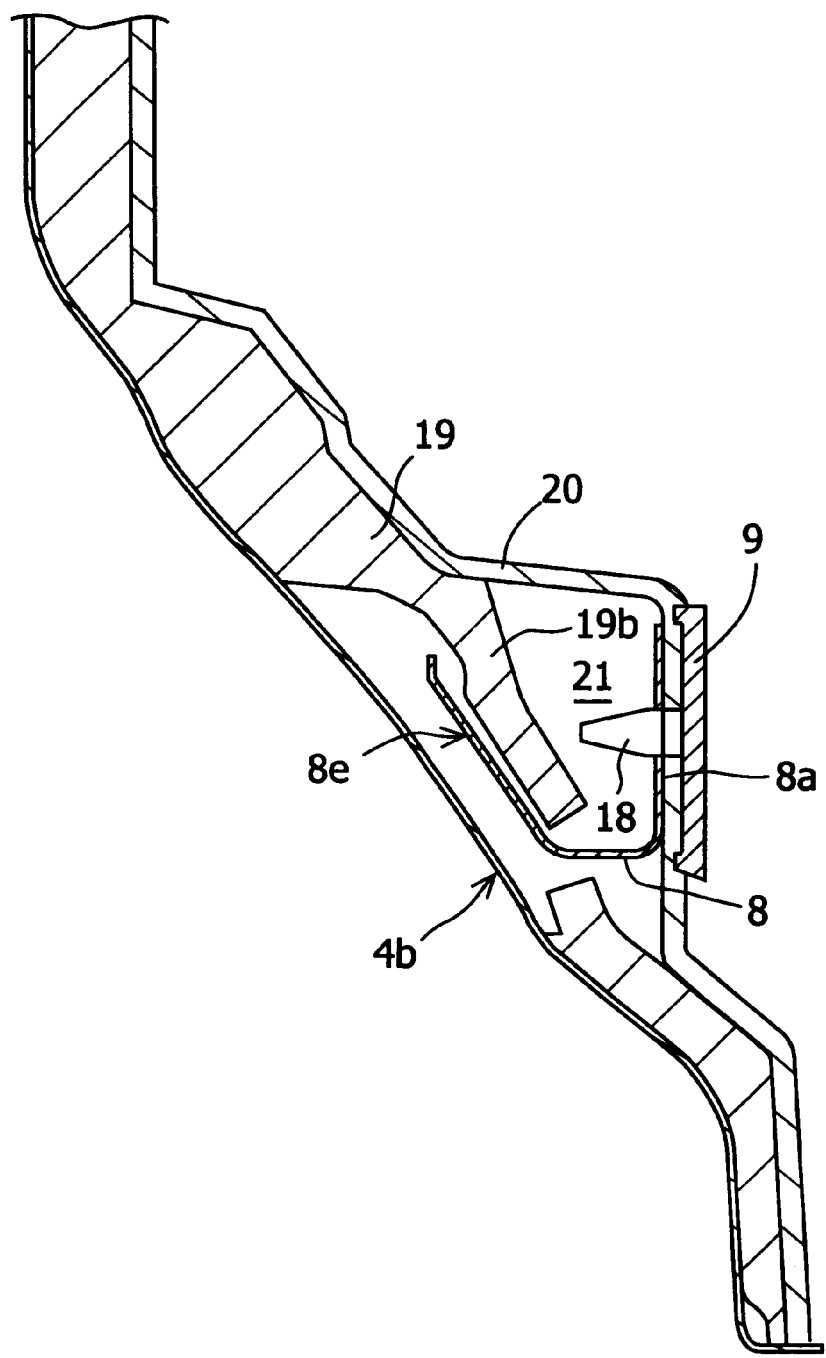
FIG. 5 is a sectional view taken along the line B—B of FIG. 4.
Figure 6:
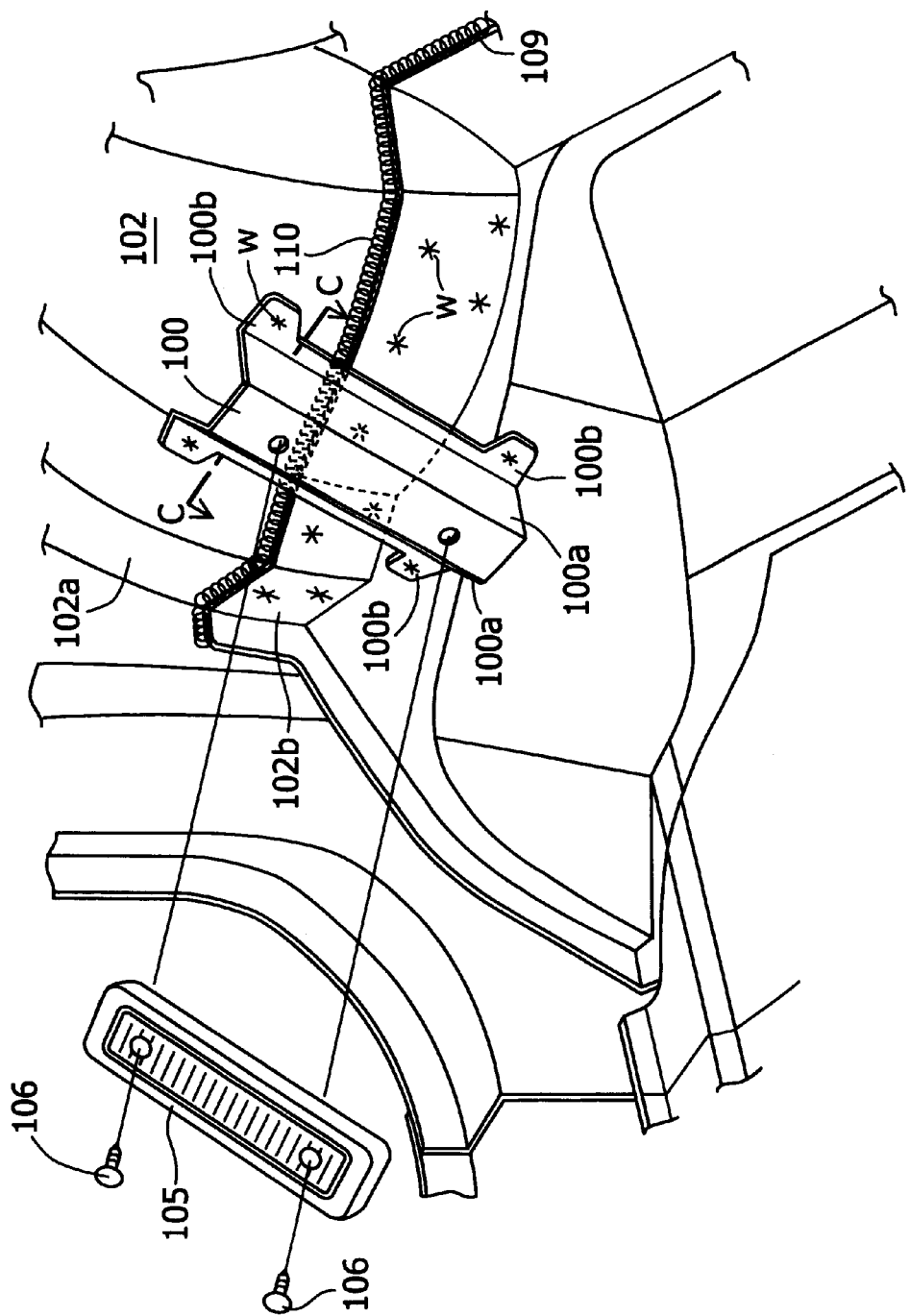
FIG. 6 is an exploded perspective view of a conventional vehicular footrest construction.
Figure 7:
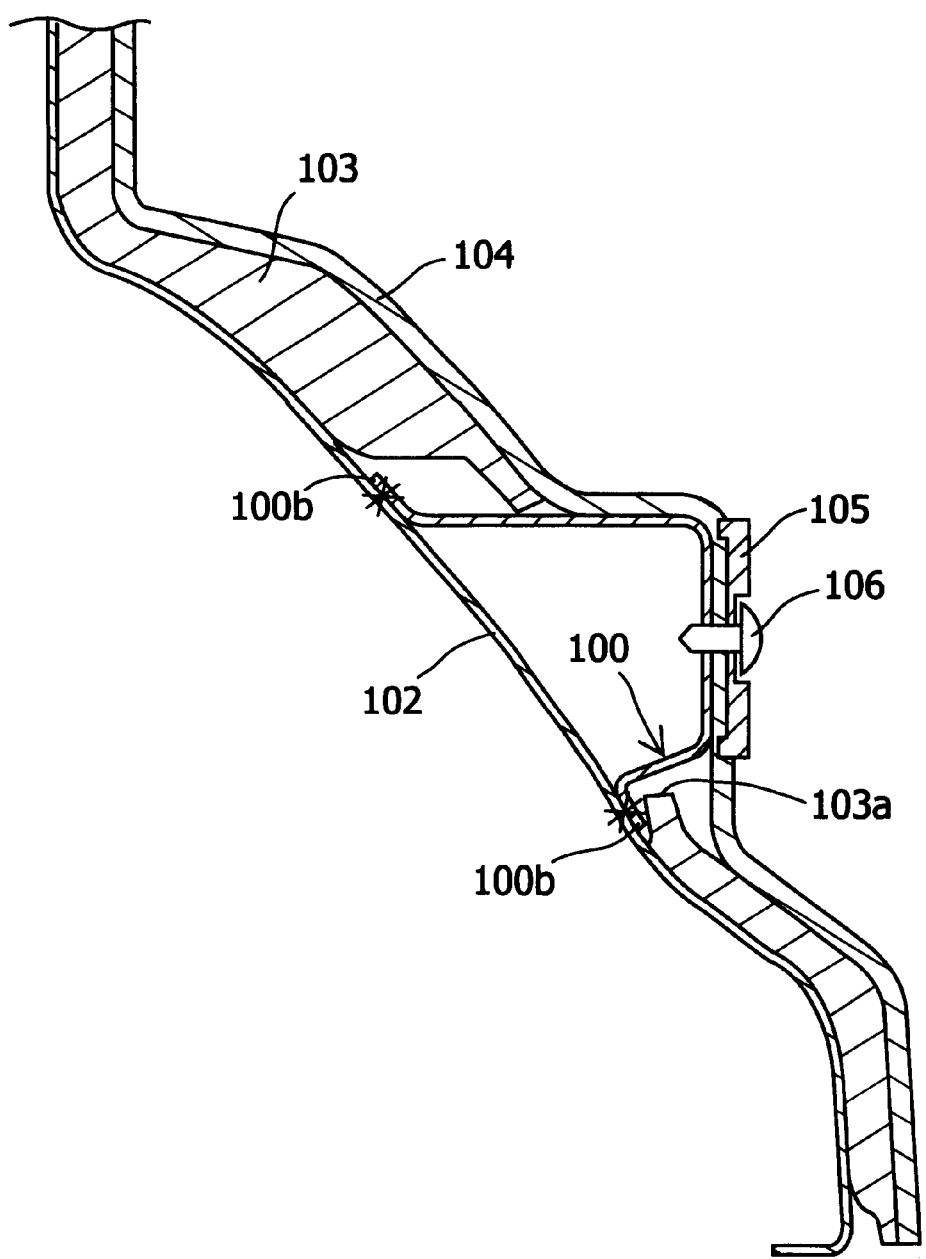
FIG. 7 is a sectional view taken along the line C—C of FIG. 6.
Figure 8:
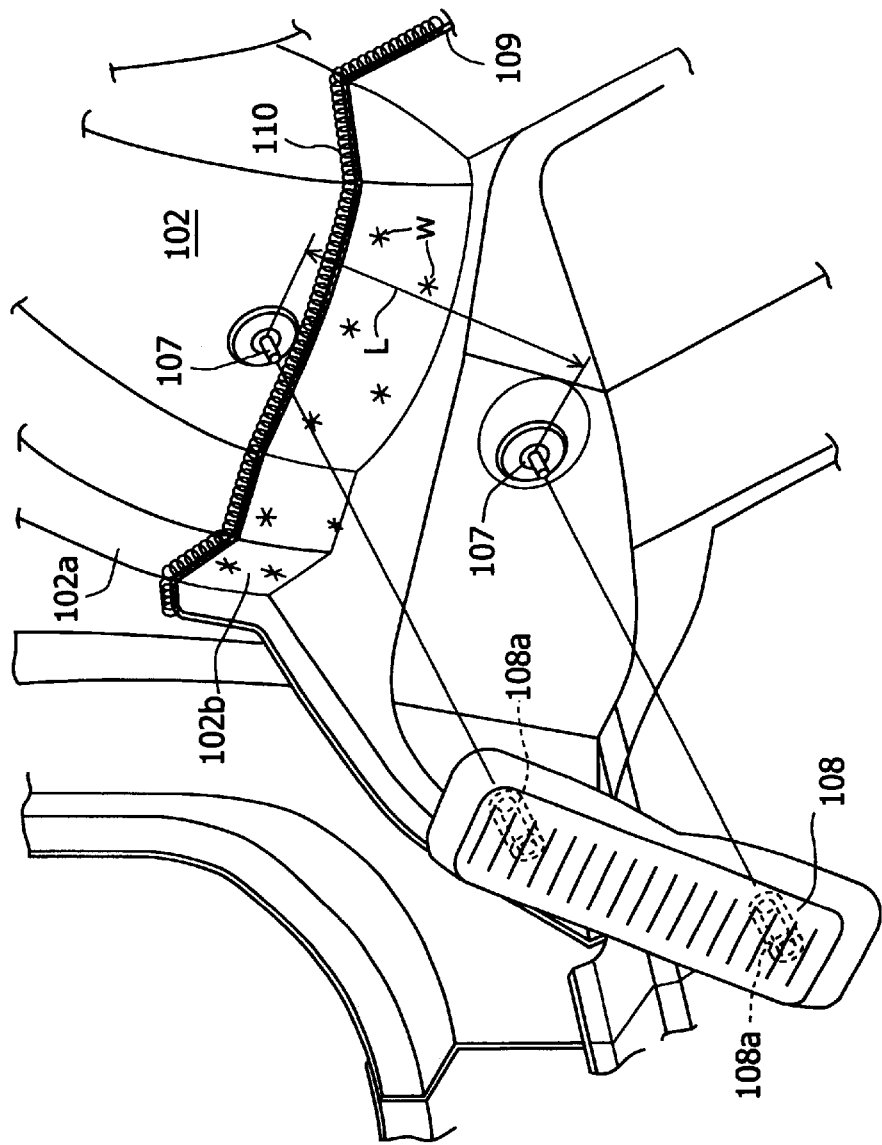
FIG. 8 is an exploded perspective view of a conventional vehicular footrest construction.

FIG. 1 shows a position at which a footrest is installed to a vehicle body. FIG. 2 is an enlarged perspective view of a portion in which the footrest is installed, FIG. 3 is a perspective view showing a state in which a footrest depression face plate shown in FIG. 2 is removed, FIG. 4 is a sectional view taken along the line A—A of FIG. 1, and FIG. 5 is a sectional view taken along the line B—B of FIG. 4.

A footrest 1 is provided at the front part of a vehicle body corresponding to the position of the left foot of a passenger as shown in FIG. 1. The footrest 1 on the left-hand side in the figure shows a footrest for a left hand drive car, and the footrest 1 on the right-hand side in the figure shows a footrest for a right hand drive car.

In front of the passenger, a dash panel 4 for isolating a cabin from an engine room is provided on the lower side of an instrument panel 3, and the footrest 1 is provided on the dash panel 4 so as to correspond to the position of the left foot of passenger on a driver seat and a passenger seat.

Figure 3:
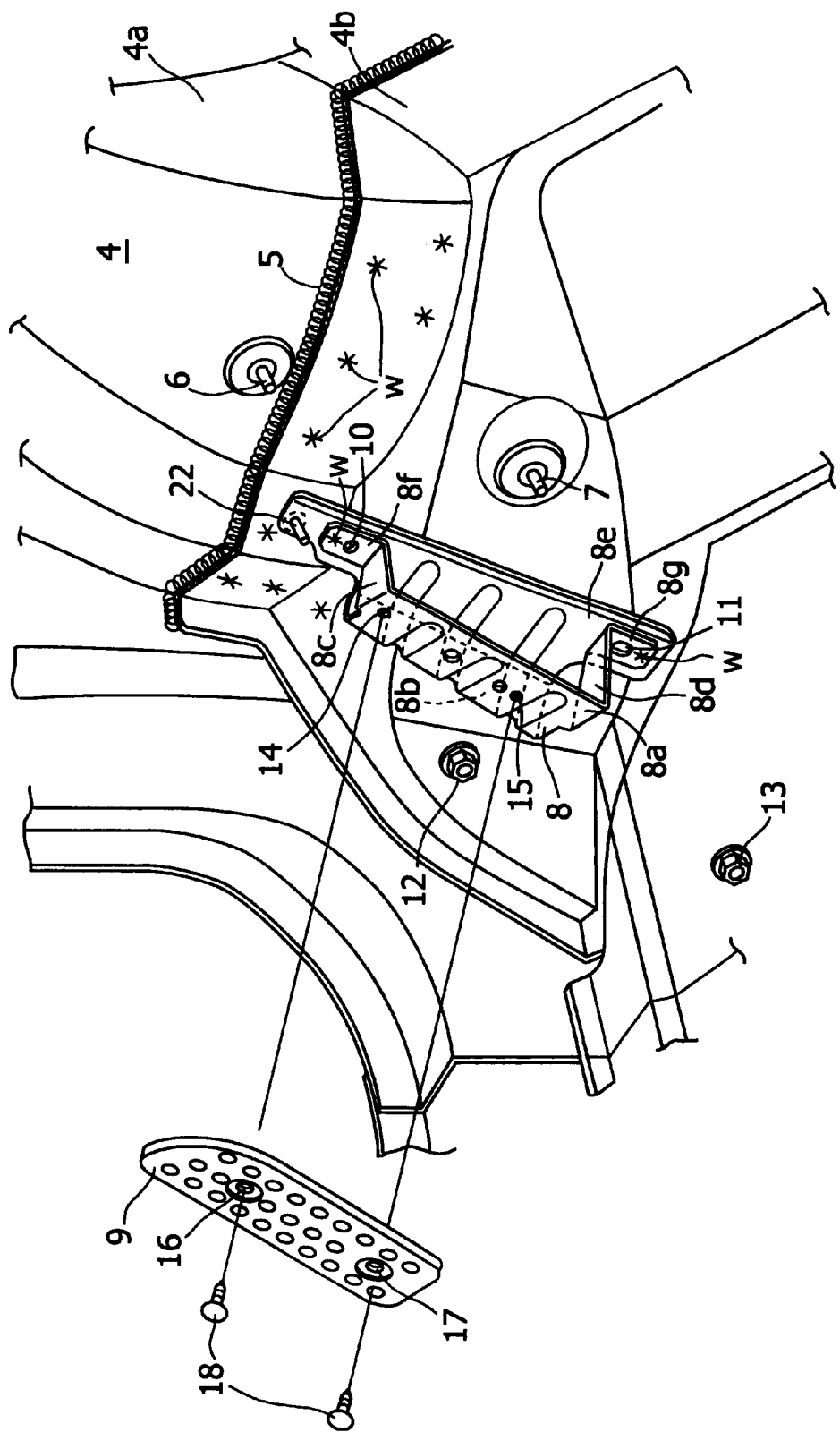
FIG. 3 is an exploded perspective view showing an embodiment of a vehicular footrest construction in accordance with the present invention.

FIGS. 2 and 3 show a footrest construction for a left hand drive car.

The dash panel 4 is made up of a dash upper panel 4a on the upper side and a dash lower panel 4b on the lower side, and lapped portions of the upper and lower panels are joined to each other by spot welds w. As the dash lower panel 4b, a steel sheet with a thickness greater than that of the dash upper panel 4a, a steel sheet with higher stiffness than that of the dash upper panel 4a, or the like steel sheet can be used. Also, to the edge of the lapped portion of the dash upper panel 4a and the dash lower panel 4b, a sealer 5 is applied to prevent water leakage.

Two bolts 6 and 7 such as stud bolts are erectly provided on the dash panel 4 at a predetermined interval so as to be directed toward the cabin. The bolt 6 is erectly provided on the dash upper panel 4a and the bolt 7 is erectly provided on the dash lower panel 4b.

The footrest 1 includes a footrest pedal bracket 8 installed by means of the two bolts 6 and 7 and a footrest depression face plate 9 installed to the footrest pedal bracket 8.

The footrest pedal bracket 8 is formed by bending one steel sheet so as to have a U-like shape in cross section in such a manner that a footrest depression face plate attaching portion 8a is supported by three wall faces 8b, 8c and 8d.

The footrest pedal bracket 8 is made up of an attachment face 8e which is installed to the dash panel 4 of a vehicle body 2, a side wall face 8b continuous with one side of the attachment face 8e, a footrest depression face plate attaching portion 8a continuous with the side wall face 8b, and upper and lower wall faces 8c and 8d formed by bending, toward the attachment face 8e, projecting portions provided at the upper and lower ends of the footrest depression face plate attaching portion 8a, by which the footrest depression face plate attaching portion 8a is supported by three wall faces 8b, 8c and 8d. At the tip ends of the upper and lower wall faces 8c and 8d, flange portions 8f and 8g are provided, respectively, so as to be lapped on the attachment face 8e. These flange portions 8f and 8g are joined to the attachment face 8e by spot welds w.

The lapped portions of the flange portion 8f, 8g and the attachment face 8e are formed with a mounting hole 10 at a position corresponding to the bolt 6 and formed with an elongated hole 11 extending in the lengthwise direction at a position corresponding to the bolt 7.

The footrest pedal bracket 8 is installed to the dash panel 4 by assembling the mounting hole 10 to the bolt 6 and assembling the elongated hole 11 to the bolt 7 and by threadedly installing nuts 12 and 13 on the bolts 6 and 7, respectively.

The footrest depression face plate attaching portion 8a of the footrest pedal bracket 8 is formed with mounting holes 14 and 15, and the footrest depression face plate 9 is clipped to the mounting holes 14 and 15. The footrest depression face plate 9 is formed with mounting holes 16 and 17 at positions corresponding to the mounting holes 14 and 15, and the footrest depression face plate 9 is fixed to the footrest depression face plate attaching portion 8a via clips 18.

In installing the footrest depression face plate 9, the footrest pedal bracket 8 is covered with a dash silencer 19 and a carpet 20, and then the footrest depression face plate 9 is fixed to the footrest depression face plate attaching portion 8*a*.

The dash silencer 19 is formed with a hole 19*a* for allowing the footrest pedal bracket 8 to pass through, and a protrusion 19*b* projecting from the edge of the hole 19*a* toward the inside of the hole 19*a* is provided. In assembling the dash silencer 19, the protrusion 19*b* is inserted into and arranged in an interior 21 in cross section of the footrest pedal bracket 8.

At the upper end of the attachment face 8*e* of the footrest pedal bracket 8, a stud bolt 22 for fixing the carpet is erectly provided, and the upper end portion of the carpet 20 is fixed to the stud bolt 22 using a clip 23.

Next, the operation of the present invention configured as described above will be described.

In assembling the footrest 1, the footrest pedal bracket 8 is assembled to the two bolts 6 and 7 erectly provided on the dash panel 4 through the mounting hole 10 and the elongated hole 11. Even when the interval between the two bolts 6 and 7 is varied by the joining of the dash upper panel 4*a* and the dash lower panel 4*b,* the position of the mounting hole 10 can be adjusted by the elongated hole 11. Therefore, accuracy is not required in installing the bolts 6 and 7.

Since the footrest pedal bracket 8 is constructed so that the footrest depression face plate attaching portion 8*a* is supported by the three wall faces 8*b,* 8*c* and 8*d,* the stiffness can be improved. Also, since the portions in which the footrest pedal bracket 8 is attached to the dash panel 4 are provided in the portions in which the flange portions 8*f* and 8*g* are lapped on the attachment face 8*e,* sufficient stiffness can be obtained.

Since the protrusion 19*b* is inserted into and arranged in an interior 21 in cross section of the footrest pedal bracket 8 in assembling the dash silencer 19, turning-up of the end portion of the dash silencer 19 and other troubles can be prevented, and thus the appearance can be improved. Also, the decrease in the sound absorption property and sound insulation property can be kept to the minimum.

The present invention is not limited to the above-described embodiment, and it is a matter of course that any changes may be made without departing from the spirit and scope of the present invention. For example, the material properties and thickness of the steel sheet used for forming the footrest pedal bracket 8 can be set arbitrarily.

As described above, according to the vehicular footrest construction in accordance with the present invention, the following effects can be achieved.

In a vehicular footrest construction in which the footrest depression face plate on which the passenger's foot is placed is disposed on the pedal bracket fixed to the vehicle body, the pedal bracket is formed by bending one steel sheet so that the footrest depression face plate attaching portion of the pedal bracket to which the footrest depression face plate is installed is supported by the three wall faces. Therefore, the stiffness can be increased, and the cost can be reduced.

Also, the pedal bracket is formed so that a U-like shape is formed by the attachment face which is installed to the vehicle body, the side wall face continuous with one side of the attachment face, and the footrest depression face plate attaching portion continuous with the side wall face, and the upper and lower wall faces are formed by bending, toward the attachment face, the projecting portions provided at the upper and lower ends of the footrest depression face plate attaching portion, by which the footrest depression face plate attaching portion is supported by the three wall faces. Therefore, the stiffness can be increased, and also the appearance can be improved by inserting the protrusion of the dash silencer into the interior in cross section of the pedal bracket and arranging it therein. Also, since the pedal bracket, except the attachment face which is attached to the vehicle body, is covered with the dash silencer, the decrease in the sound absorption property and sound insulation property can be kept to the minimum.

Further, the flange portions provided at the tip ends of the upper and lower wall faces are joined to the attachment face, and mounting holes for mounting the pedal bracket on the vehicle body side are formed in the lapped portions of the flange portion and attachment face. Therefore, the stiffness of the pedal bracket can be increased, and the strength and thickness of a portion in which the footrest is installed to the vehicle body can be increased.

Still further, the pedal bracket is fixed, through the mounting holes, on the bolts mounted on the dash panel, and the pedal bracket is installed after a painting process. Therefore, the welding work efficiency for the welding of the lapped portion of the dash upper panel and the dash lower panel constituting the dash panel can be improved. Also, the work for applying a sealer to the lapped portion of the dash upper panel and the dash lower panel can be performed easily.

Since at least one of the mounting holes is formed into an elongated hole extending in the vertical direction, the allowable range of dimensional accuracy of the pitch of mounting bolts becomes wide, so that the cost can be reduced.

Further, since the bolt for fixing a carpet is provided on the upper side of the attachment face, the upper part of carpet can be fixed, and turning-up of the end portion and other troubles can be prevented. Therefore, the appearance can be improved.

What is claimed is:

1. A vehicular footrest construction in which a footrest depression face plate on which the passenger's foot is placed is supported by three walls of a pedal bracket, said pedal bracket formed such that there is an attachment face that is installed to a vehicle body, a sidewall face continuous with one side of said attachment face, an upper wall face, a lower wall face, and a footrest depression face plate attaching portion, whereby said footrest depression face plate is attached to said footrest depression face plate attaching portion such that said sidewall face continuous with one side of said attachment face, said upper wall face and said lower wall face are three wall faces that support said footrest depression face plate.

2. The vehicular footrest construction according to claim 1, wherein said pedal bracket is formed so that a U-like shape is formed by said attachment face, said sidewall face continuous with one side of said attachment face, said footrest depression face plate attaching portion, said upper wall face and said lower wall face are formed by bends made towards said attachment face, projecting portions at the upper and lower ends of said footrest depression face plate attaching portion.

3. The vehicular footrest construction according to claim 2, wherein flange portions provided at the tip ends of said upper and lower-wall faces are joined to said attachment face, and mounting holes for mounting said pedal bracket on the vehicle body side are formed in lapped portions of said flange portion and attachment face.

4. The vehicular footrest construction according to claim 3, wherein said pedal bracket is fixed, through said mounting holes, on bolts mounted on a dash panel, and said pedal bracket is installed after a painting process.

5. The vehicular footrest construction according to claim 2, wherein flange portions provided at the tip ends of said upper and lower wall faces are joined to said attachment face, mounting holes for mounting said pedal bracket on the vehicle body side are formed in lapped portions of said flange portion and attachment face, and at least one of said mounting holes is formed into an elongated hole extending in the vertical direction.

6. The vehicular footrest construction according to claim 3, wherein said pedal bracket is fixed, through said mounting holes, on bolts mounted on a dash panel, at least one of said mounting holes is formed into an elongated hole extending in the vertical direction, and said pedal bracket is installed after a painting process.

7. The vehicular footrest construction according to any one of claims 2 to 6, wherein a bolt for fixing a carpet is provided on the upper side of said attachment face.

8. The vehicular footrest construction according to claim 1, wherein said footrest depression face plate attaching portion of said pedal bracket is formed so as to be parallel to said attachment face that is installed to said vehicle body.

9. The vehicular footrest construction according to claim 2, wherein a corresponding portion to said footrest depression face plate attaching portion of a dash silencer that is assembled to said vehicle body is inserted into and arranged in an interior cross-section of said pedal bracket.

* * * * *